United States Patent [19]

Cook

[11] 4,248,994

[45] Feb. 3, 1981

[54] POLYURETHANE COMPOSITIONS DERIVED FROM POLYOLS CONTAINING A CONTROLLED DISTRIBUTION OF CARBOXAMIDE GROUPS

[75] Inventor: William H. Cook, Bloomfield Hills, Mich.

[73] Assignee: Fabridyne, Inc., Bloomfield Hills, Mich.

[21] Appl. No.: 48,395

[22] Filed: Jun. 14, 1979

[51] Int. Cl.$^3$ ............................................. C08G 18/32
[52] U.S. Cl. ........................................ 528/60; 528/65; 528/66; 528/73; 528/77; 528/78; 528/80; 528/81; 528/83; 528/84
[58] Field of Search ................. 528/60, 65, 66, 73, 528/77, 78, 80, 81, 83, 84

[56] References Cited

U.S. PATENT DOCUMENTS

| | | | |
|---|---|---|---|
| 2,933,477 | 4/1960 | Hostettler | 260/18 TN |
| 2,933,478 | 4/1960 | Young et al. | 260/18 TN |
| 2,990,379 | 6/1961 | Young et al. | 521/172 |
| 3,186,971 | 6/1965 | Hostettler et al. | 521/172 |
| 3,833,641 | 9/1974 | Papa et al. | 528/78 |

*Primary Examiner*—Maurice J. Welsh
*Attorney, Agent, or Firm*—Gordon W. Hueschen

[57] ABSTRACT

Polyols containing at least one carboxamide group, —[NHC=O]—, in the polyol backbone impart to polyurethane resin-forming systems a unique combination of normal pot life and accelerated curing characteristics without sacrifice of final physical properties. Methods are given for preparation of such polyols which enable incorporation of a small, predetermined number of such carboxamide groups, not exceeding in number the hydroxyl functionality of the polyol, into each and every individual polyol molecule. The rapid-curing/property-development characteristics of derived polyurethane resin-forming systems are especially valuable in molding operations, where both mold cycle times and curing energy requirements are substantially reduced in comparison with conventional polyurethane resin-forming systems having similar final physical properties.

16 Claims, No Drawings

POLYURETHANE COMPOSITIONS DERIVED FROM POLYOLS CONTAINING A CONTROLLED DISTRIBUTION OF CARBOXAMIDE GROUPS

FIELD OF INVENTION AND PRIOR ART

The invention relates to polyurethane resin-forming systems comprising a polyol resin and a polyurethane-forming amount of a polyisocyanate and to processes in which the two components are mixed together, formed while the mixture is unset, and then allowed to cure and set up into the desired formed body. The invention is particularly directed to polyurethane resin-forming systems and processes of the above character in which there is at least one carboxamide group, —[NH-C=O]—, in the polyol resin backbone thereof, up to not more than one such group per each hydroxyl group.

BACKGROUND OF THE INVENTION

Polyurethane systems used in the manufacture of finished polyurethane resin bodies or articles can be classified in many ways, according to both chemical derivation and to type of final fabrication process. For example, a given polyurethane system may be classified according to the type of backbone (e.g., polyether or polyester), type of isocyanate employed (aromatic or aliphatic), type of chain extender (e.g., polyol, polyamine, water, etc.) and according to many other reactive components, additives, solvents, etc., that may be employed at one point or another, if not in the final processing step. Moreover, under each principal category there may be, and generally are, two or more subclassifications which are of commercial importance. For example, two important subclasses of polyether urethanes are the polyoxypropylene/ethylene class and the polyoxytetramethylene class.

With respect to type of final fabrication process, polyurethane resin-forming systems may be classified as belonging to one of two principal groups: (1) the group in which a chemical reaction of the polyurethane resin-forming system occurs in the final processing step to provide a polyurethane resin with mature physical properties, as is usually the case in polyurethane foam systems and castable elastomer-forming systems, for example; and, (2) the group in which there is essentially no chemical reaction in the final processing step, as in the case of polyurethane thermoplastic resins which are employed in thermoforming operations and in certain adhesive and coating applications.

In systems of group (1), that is, polyurethane resin-forming systems in which a high molecular weight polymer resin with mature physical properties is first obtained in the forming step in which the end-use article is produced, it is generally desirable that the reactive polyurethane resin-forming system have a pot life sufficiently long to enable convenient handling, such as the filling of a mold with the reactive system in a liquid state, together with rapid curing characteristics which require a minimum of heat input to supplement the natural heat of reaction of the system. Such curing characteristics are desirable in the interest of energy conservation and minimum and demold time and/or curing time, which factors relate to the ultimate manufactured cost of the finished polyurethane resin bodies.

In recent years, as energy costs and labor and production overhead costs have increased sharply, great attention has been given new techniques for reduction of curing energy requirements and the combined production time and investment factors as they relate to the costs of finished articles. For example, new manufacturing techniques such as reaction injection molding (RIM) have been developed for the manufacture of molded polyurethane resin bodies as well as for molded bodies derived from other types of reactive polymer systems. Among the advantages of the RIM molding technique is the facile employment of highly reactive systems with short pot lives. Not only can these systems be demolded more rapidly than systems used in traditional molding operations but, as a result of the greater reactivity, post-curing time and energy requirements often are sharply reduced as well.

Also, especially in the manufacture of polyurethane foams, there is a trend toward utilization of systems which offer improved curing characteristics even though the purchased costs of the chemicals are greater than the costs of alternate systems which provide adequate final physical properties. In many cases the "premium" systems provide the lower final manufactured costs by means of increased production rates and/or reduced time/temperature post-cure requirements. Moreover, the polymer resin physical properties provided by the premium systems generally are superior to those of standard systems and, in the end-use application, an additional cost/performance advantage may be realized which complements the original manufactured cost advantage of the finished polyurethane article.

The advantages of RIM and other advanced polyurethane resin fabrication techniques notwithstanding, there is a continuing search for polyurethanes resin-forming systems of group (1) with improved pot life/curing requirement characteristics. If pot life can be increased without increasing demold time and/or post-curing time/temperature requirements, it is generally the case in a given system that catalysis can be employed so as to further reduce post-cure requirements while keeping the pot life above the minimum acceptable level. Therefore new systems which, without catalysis, provide improved combinations of pot life and curing characteristics, are of great general interest. As a great variety of catalysts for urethane systems is commercially available, and in view of the fact that catalysis in this field has been extensively studied (see, for example, J. H. Saunders and K. C. Frisch, "Polyurethanes: Chemistry and Technology," Part I, Interscience, New York-London (1962) pp. 129–211), it is then a comparatively straightforward matter to catalyze any such inherently improved polyurethane resin-forming system so as to optimize its pot-life/curing characteristics for a given application.

If a given polyurethane resin-forming system is considered as a reference point with respect to the combination of pot life and curing characteristics which it provides, there are a number of independent variables which can generally be manipulated for the purpose of improving that combination of properties. That is, for the purpose of extending the pot life without increasing the cure requirements of time and/or temperature; for the purpose of reducing the cure requirements without shortening the pot life; or, hopefully, for the purpose of simultaneously extending the pot life while reducing the cure requirements. Such independent variables include, among others, the starting temperature of the reactants when they are first mixed to provide the reactive polyurethane resin-forming system; external heat input to the reaction mixture; the choice of catalyst and concentration thereof; and, the choice of reactants and their relative proportions.

Although variation of all of the above independent variables is necessary in general in the process of optimizing a polyurethane resin-forming system for a given application, the choice of reactants provides the greatest opportunity for adjustment of the characteristics of the reacting polyurethane resin-forming system as well as the physical properties which it will exhibit in its final cured state. Even though at the present time there are dozens of polyisocyanate products and hundreds of polyols and other reactive hydrogen compounds commercially available and economically feasible for use in formulation of new polyurethane resin-forming systems, there is a continuing effort to develop new reactants which impart improved combinations of pot life and curing characteristics and/or final physical properties. These development efforts are directed toward all three principal types of reactive intermediates employed in polyurethane resin-forming systems: the polyisocyanates, the polyol resins, and the low-molecular-weight intermediates commonly termed "chain extenders". For example, in the case of polyol resins, there has been a major effort in recent years to develop new types of "capped" polyether polyols; these are starting polyoxypropylene polyols which have been further reacted with ethylene oxide, principally for the purpose of providing a higher ratio of primary to secondary hydroxyl groups in the finished polyether polyol. Primary hydroxyl groups are substantially more reactive with isocyanates than are secondary hydroxyl groups, and the "capped" polyether polyols therefore offer, among other features, improved curing characteristics in polyurethane resin-forming systems. Such polyols are particularly useful in polyurethane foam-forming systems.

Since, on a weight basis, the polyol resin component is typically the principal component of polyurethane resin-forming systems, often accounting for more than half the total weight of reactive components, it is particularly desirable to improve individual reactivity characteristics of the polyol component, if at all possible, in any effort to improve the overall reactivity and curing characteristics of the polyurethane resin-forming system. However, with the notable exception of the aforementioned capped polyether polyols, it is generally difficult to make such improvements without bringing into play accompanying performance and/or economic disadvantages. For example, if the hydroxyl functionality of the polyol is increased so as to shorten demold time, many physical properties of the finished polyurethane resin product will be affected and the overall result generally is undesirable; the optimum polyol resin functionality usually is predetermined on the basis of final physical property considerations rather than pot life and/or curing characteristic considerations. Similarly, if some or all of the hydroxyl groups of the polyol resin are replaced by other reactive hydrogen groups (leaving aside the question of whether such modification is economically and/or technically feasible) the pot life and curing characteristics can indeed be significantly changed; but, in general where there is an improvement in one characteristic, the other will be adversely affected. If some or all of the hydroxyl groups of a polyol resin are replaced by primary amino groups, for example, the curing time and curing energy requirements of a given derived polyurethane resin-forming system will be sharply reduced. However, the pot life of the system also will be sharply reduced, and there will be other behavioral changes in both the reacting system and the final, cured product, which other changes will generally not be acceptable.

In polyurethane resin-forming systems, particularly in those where the polyol resin component is di-functional (the functionality being predetermined for purposes of achieving certain final polyurethane physical properties), curing to a demoldable or handleable state often involves some degree of secondary, network-forming reactions of residual isocyanate such as the reaction of residual isocyanate with carbamate N—H groups formed in an earlier stage of the polymerization process. Other reactive hydrogen-containing groups, when present, also are involved in like reactions with residual isocyanate. The carboxamide group, —[NH—C=O]—, for example, has been incorporated in polyol resins as a reactivity and final physical property modifier, but not in the proportions and distribution, or for the purposes contemplated by this invention.

For example, polyester polyol resins generally are manufactured by means of condensation polymerization reactions in which it is not possible to control the distribution of carboxamide groups among individual polyester molecules. In such reactions, an average of one or two carboxamide groups per polyester polyol molecule can be built in by inclusion of the appropriate amounts of, for example, monoethanolamine or hexamethylenediamine, respectively, but the actual polyester polyol product will be comprised of a significant proportion of molecules with no carboxamide groups, some molecules with the desired number (one or two) carboxamide groups, and another significant proportion of molecules with a surplus of carboxamide groups. While such mixtures are capable of offering some improvement in pot life/curing characteristics without undue sacrifice of other desirable behavioral characteristics, the overall improvements by these means are not as great as might be desired. While some polyester polyols containing a molecularly-uniform distribution of the carboxamide group have been disclosed in the prior art in connection with various polymer applications, including polyurethane resins (see, for example, U.S. Pat. Nos. 2,933,477; 2,933,478; 2,990,379; 3,169,945; and, 3,186,971), there has heretofore been no recognition of the surprising and unexpected behavior obtained in accordance with the invention by the incorporation of such special carboxamide-modified polyols in a polyurethane resin-forming system.

OBJECTS OF THE INVENTION

It is an object of the invention to provide an improved polyurethane resin-forming system. It is a further object of the invention to provide improved pot life/curing characteristics of polyurethane resin-forming systems. Further objects of the invention are to avoid the disadvantages of the prior art and to obtain such advantages as will appear as the description proceeds.

BRIEF DESCRIPTION OF THE INVENTION

It has now been found that these objects are accomplished, according to the present invention, in a polyurethane resin-forming system which comprises a polyol, each molecule of which has at least one carboxamide group, —[NHC=O]—, in the backbone thereof, up to and not more than one such group per hydroxyl group, and a polyurethane resin-forming amount of a polyisocyanate. It has been found in accordance with the invention that, when these two components, alone or in admixture with other components, such as chain extenders, are mixed and the mixture formed while still in the fluid unset state and then allowed to set up while in the formed condition to form a polyurethane resin body, accelerated curing characteristics are obtained without sacrifice of physical properties and without adversely affecting the pot life of the system.

Polyols, each molecule of which has at least one unsubstituted carboxamide group in the backbone thereof, up to not more than one such group per hydroxyl group, can be prepared conveniently by means of certain addition polymerization procedures, and also by means of certain condensation polymerization procedures where the polymer is of the "heat-to-tail" type, as opposed to the "head-to-head, tail-to-tail" type which includes most conventional polyol resins employed industrially in polyurethane systems.

If just one carboxamide group, —[NHC=O]—, is incorporated into each molecule of a polyol resin, the curing time/temperature requirements of derived polyurethane reaction systems can be drastically reduced without significant loss of pot life and without deleterious change of final polymer physical properties. Similarly, good results are obtained where up to one such carboxamide group is incorporated in each molecule of a polyol resin per each hydroxyl group thereof. However, precisely one carboxamide group per polyol molecule often is the most preferred number of such groups where the object is reduction of curing requirements without appreciable change of other properties of the system.

Polyester polyol resins, each molecule of which has at least one carboxamide group, —[NHC=O]—, in the backbone thereof, up to not more than one such group per hydroxyl group, can be prepared, among other ways, by reaction of a suitable primary-amino-containing "initiator" with (1) a suitable lactone or mixture of lactones; or, with (2) a suitable hydroxyl-substituted carboxylic acid or ester thereof; or, (3) a mixture of such lactone(s), hydroxyl-substituted carboxylic acid(s) and/or ester(s). For example:

tion of the carboxamide containing polyols of the invention or which are reactive toward isocyanates in subsequent applications of the polyols.

If the initiator is an aminoalcohol of type Ia, the product is a polyesterdiol containing one [NH—C=O] group in each and every hydroxyl-terminated polyester molecule; if the initiator is a diamine of type Ib, the product is a polyesterdiol containing two carboxamide groups in each polyester molecule, one per each hydroxyl group. If a primary aminodiol is employed as initiator, the product is a polyestertriol containing one carboxamide group in each polyester molecule; and, if the initiator is a di(primary amino) monohydroxy compound, the product will be a polyestertriol containing two carboxamide groups in each molecule, etc.

Another type of addition polymerization procedure which is applicable to preparation of urethane-grade polyester polyol resins containing the desired molecularly-uniform distribution of unsubstituted carboxamide groups involves the reaction of a suitable primary-amino-containing initiator as above with the cyclic anhydrides of certain dicarboxylic acids, and subsequent reaction of the thus-produced carboxylic acid terminated carboxamide-containing moiety with a mixture of additional cyclic anhydride of a dicarboxylic acid and an epoxide, which mixture contains a molar excess of epoxide:

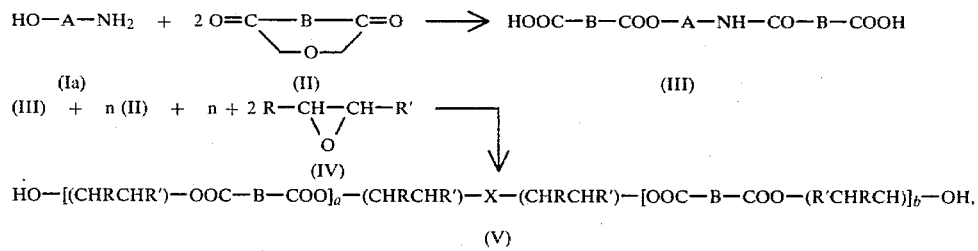

where "B" is a divalent hydrocarbon radical, the dicarboxylic acid derivative of which is capable of forming a cyclic anhydride; "X" is the diester moiety derived from the dicarboxylic acid, III; and $a+b=n$. Both a and b can be zero. As a modification of this approach to preparation of the carboxamide-containing urethane-grade polyols of the invention, it is sometimes possible to combine lactone polymerization, hydroxyacid polymerization or hydroxyacid ester polymerization, as described above, with the primary-amino-containing initiator/cyclic anhydride/epoxide reaction.

Still another type of addition polymerization procedure for preparation of the polyols of the invention, which is applicable to preparation of urethane-grade polyether polyol resins containing a predetermined and molecularly uniform distribution of carboxamide

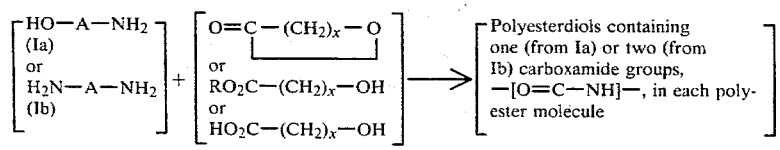

where "A" is a divalent hydrocarbon radical or suitably inert substituted divalent hydrocarbon radical, preferably a divalent aliphatic hydrocarbon radical. By "suitably inert" is meant that the moiety "A" contains no sites which are reactive under the conditions of preparagroups; involves the addition-polymerization of an epoxide, using as initiator a compound containing a suitable carboxamide group as defined hereinabove together with two or more epoxide-reactive hydrogen atoms such as are provided by primary and secondary amino or hydroxyl groups, carboxylic acid groups, etc. It is of course necessary to employ reaction conditions which will not bring about attack on the carboxamide groups. Suitable such carboxamide-containing initiators include, for example, among many other compositions, the afore-mentioned reaction products of primary-amino-containing initiators with lactones and/or hydroxyacids and/or hydroxyacid esters, which reaction products are polyols containing the carboxamide group, —[NHC=O]—; and, polycarboxylic acids containing the —[NHC=O]— group, such as those included broadly under Structure III hereinabove.

In every case except certain instances where epoxides are employed, the combined number of amino (except tertiary amino) and hydroxyl groups in the initiator determines and will be equal to the hydroxyl functionality of the polyol product, and the ratio of initiator to other reactants determines the number average molecular weight of the polyol product. In general, there will be a measurable residuum of primary amine unless epoxide reactants are employed; in the case of diamine initiators, any such residuum will be small and, in the case of monoamine initiators, negligible for practical purposes. It is believed that any residuum of amine occurs as amino end groups on polyester molecules, with only a tiny fraction of the residuum remaining as unreacted initiator.

Where epoxides are employed as reactants, the products of course will be properly classified as polyether polyols or as polyether-ester polyols or as polyester polyols depending upon what types of epoxide reactions occur and upon whether there are polyether or polyester moieties in the primary-amino-containing initiator. Also, if there are primary amino groups in the initiator which are available for reaction with the epoxide, the hydroxyl functionality of the final polyol product will be greater than in reaction systems involving no epoxide-primary amine reactions. These relationships are familiar to those skilled in preparation of conventional urethane-grade polyether polyols and polyester polyols. Some convenient general approaches to the preparation of carboxamide-containing polyether polyols of the invention are as follows:

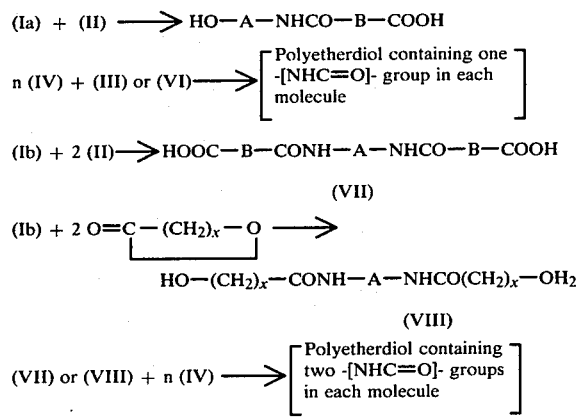

The carboxamide-modified polyols of the invention are employed essentially as replacements for conventional polyester polyols or polyether polyols, as the case may be, in urethane systems in which the polyol is a reactant in the final reaction step and in which systems it is desired to obtain improved curing behavior without appreciable loss of pot life. Alternatively, these polyols may be employed in other types of urethane systems. Still other applications, including non-urethane-related applications of polyols, will now be apparent to those skilled in the art.

The types of urethane systems in which carboxamide-modified polyols of the invention may be employed to particular advantage for the purpose of securing improved curing characteristics without appreciable loss of pot life include castable elastomer systems; two-component, polyol-cure caulk, binder and adhesive systems; rigid, semi-rigid and flexible foam systems providing foams of all densities; microcellular elastomer systems; and two-component, polyol-cure coating systems. In order to realize the benefits, relative to conventional systems, of accelerated cure without sacrifice of pot life, it is essential that the system in each case employ a carboxamide-modified polyol of the invention as a partial or complete replacement for a conventional polyol in the formulation, and that the system be of a type in which the carboxamide-modified polyol reacts with isocyanate in the final reaction step in which the finished polyurethane article is produced.

The carboxamide-modified polyols of the invention also may be employed in urethane systems in which the carboxamide-modified polyols are reacted with isocyanate prior to the final reaction step in which a polyurethane article is produced. However, in such systems it must be taken into account that the carboxamide groups, —[NHC=O]—, are isocyanate-reactive, even though not so reactive as primary or secondary hydroxyl groups. In general, where normal reaction temperatures and/or storage periods are employed in the manufacture of urethane intermediates involving reaction of isocyanate with the carboxamide-modified polyols of the invention, there will be a measurable degree of reaction of isocyanate with the carboxamide moiety. Where a strictly linear polyurethane intermediate or end product is desired, as, for example, in the cases of many polyurethane thermoplastics, it often is not feasible to employ a carboxamide-containing diol of the invention in place of a conventional polyetherdiol or polyesterdiol in view of the branching which will occur at some of the carboxamide moieties. In other cases, where branching can be tolerated, or where it is desired, advantageous formulations based upon urethane intermediates derived from the carboxamide-modified polyols of the invention generally can be devised. Opportunities for employing such carboxamide-modified polyols in polyurethane intermediates and, subsequently, in polyurethane systems will be apparent to those skilled in the art, judgement in such cases being based upon predetermination of the extent of reaction of any carboxamide groups present under the conditions employed in preparation and storage of the intermediates. If unreacted carboxamide groups are present in a polyurethane intermediate derived from a carboxamide-modified polyol of the invention at the onset of a final polyurethane-producing reaction employing such an intermediate, the carboxamide groups will, of course, be available for reaction with isocyanate and can serve to accelerate curing of the polyurethane article thus produced. However, the relative improvement in curing characteristics generally will not be as great as in systems where a carboxamide-containing polyol of the invention has replaced a conventional polyol in the final polyurethane-producing step.

In polyurethane systems of the type to which the polyols of the invention are particularly directed, that is, systems in which a polyol resin is reacted with isocyanate in the final polyurethane-producing step, there are generally one or more other isocyanate-reactive compounds present besides the polyol resin itself. Usually, one or more chain extenders, e.g., low molecular weight polyols, polyamines, aminoalcohols, or other low molecular weight compounds having at least two isocyanate-reactive groups, are present in the formulation so as to provide a finished polyurethane with the desired content and distribution of additional urethane and/or urea groups. The content and distribution of urethane and urea groups in the polymer in turn are major factors determining final polymer properties, such as hardness, tensile and compression properties, and elasticity.

Suitable such low molecular weight diol chain extenders include poly(methylene)glycols of the general formula HO(CH$_2$)$_n$OH and n equals two to about twelve; lower poly(oxyalkylene)glycols such as diethylene glycol, triethylene glycol tetraethylene glycol, dipropylene glycol and tripropylene glycol; cycloaliphatic diols such as cyclobutane-1,3-diol, cyclopentane-diols, cyclohexanediols, 1,3-bis(hydroxymethyl)cyclobutane, bis(hydroxymethyl)cyclopentanes, bis(hydroxymethyl)cyclohexanes, 4,4'-methylenebis(cyclohexylmethanol), and lower alkylene oxide adducts thereof containing up to about four oxyalkylene residues; 1,3-butanediol and 1,2-butanediol; other alkanediols of up to about 15 carbon atoms where the hydroxyl groups may be primary or secondary hydroxyl groups, such as neopentyl glycol and 2,2,4-trimethylpentane-1,5-diol; N-alkyl- and N-aryl-substituted alkanolamines, such as N-methyldiethanolamine and N-phenyldiethanolamine; and, other aromatic-aliphatic diols such as 1,4-bis(2-hydroxyethoxy)benzene, 1,3- and 1,4-bis(hydroxymethyl)benzene, and 4,4'-methylenebis[N-methyl-N-(2-hydroxyethyl)aniline]; and, other lower diols containing primary and/or secondary hydroxyl groups and optionally containing other functional groups which are non-interfering when said diols are employed in polyurethane formulations. Common examples of such non-interfering groups are carboxylic acid ester groups and ether groups.

Useful triols and higher-functionality polyol chain extenders include such compounds as glycerol; 1,1,1-trimethylolpropane and 1,1,1-trimethylolethane; 1,2,4-butanetriol and 1,2,6-hexanetriol; trialkanolamines such as triethanolamine and triisopropanolamine; alkylene oxide adducts of polyamines containing three or more epoxide-reactive hydrogen atoms, such as N,N,N',N'-tetrakis(2-hydroxyethyl)ethylenediamine and N-(2-hydroxyethyl)-N'-[2-bis(2-hydroxyethyl)amino)ethyl]-piperazine; and alkylene oxide adducts of these and other compounds containing three or more epoxide-reactive hydrogen atoms such as pentaerythritol, sorbitol, sucrose, α-methylglucoside, phenolic resins and aromatic amine-formaldehyde resins, said alkylene oxide adducts containing up to about three oxyalkylene residues per epoxide-reactive hydrogen atom of the parent compound. Other useful lower molecular weight polyols will be apparent to those skilled in the art.

Useful aminoalcohol chain extenders include monoethanolamine; diethanolamine; monoisopropanolamine and diisopropanolamine; diglycolamine; N-(2-hydroxyethyl)piperazine; hydroxymethylcyclohexyl amines and aminomethylcyclohexanols; 3-aminopropanol-1 and 6-aminohexanol-1; and, oxyalkylated polyamines in which one or more, but not all, of the epoxide-reactive hydrogen atoms have been reacted with an alkylene oxide, such as N,N'-bis(2-hydroxyethyl)1,3-propanediamine and N,N'-bis(2-hydroxypropyl)-4,4'-methylenedianiline. Many other such useful aminoalcohols are known to those skilled in the art.

Useful polyamine chain extenders include a variety of aliphatic, cycloaliphatic and aromatic diamines and higher-functionality polyamines bearing primary and/or secondary amino groups, such as ethylene diamine; propylene diamine; 1,3-diaminopropane; hexamethylene diamine; cyclohexanediamines; piperazine; 4,4'-oxydianiline; 4,4'-methylenedianiline; 4,4'-methylenebis(2-chloroaniline); 3,3'-dichlorobenzidine; the phenylene and tolylene diamines; aromatic amine-formaldehyde resins; diethylene triamine; triethylene tetramine; 4,4'-methylenebis(N-methylaniline); 4,4'-methylenebis(methyl anthranilate); 1,5-naphthalene diamine; and, lower poly(oxyalkylene)diamines. Still other useful polyamino compounds will be apparent to those skilled in the art.

Another low molecular weight, isocyanate-reactive compound which deserves special mention in this connection is water, which, upon reaction in a polyurethane formulation, ultimately provides one urea group plus one molecule of carbon dioxide per molecule of water reacted. The use of the carbon dioxide gas thus produced as a blowing agent in the preparation of polyurethane microcellular elastomers and foams of all densities is well known to those skilled in the art, as are applications of other less commonly used types of low molecular weight, isocyanate-reactive compounds which can be employed, together with the polyols of the invention, to provide special effects and/or ultimate physical properties.

The ratio of lower molecular weight, isocyanate-reactive compound(s) to the carboxamide-modified polyol(s) of the invention which may be employed to produce the polyurethanes of the invention varies widely, depending upon the type of polyurethane end product which it is desired to produce. Generally speaking, the percentage of total reactive hydrogen equivalents in the polyurethane formulation which is accounted for by low molecular weight isocyanate-reactive components may range from zero, in the case of such polyurethanes as very soft castable elastomers, to upwards of 90 percent, in the case of very hard castable elastomers and other hard compositions; the remaining reactive hydrogen equivalents are comprised by the polyol(s) of the invention together with any conventional polyol resin(s) or other high molecular weight reactive hydrogen compounds which are employed in a given formulation. For example, an intermediate-hardness (80 Shore A) one-shot castable elastomer composition derived from 4,4'-diphenylmethane diisocyanate, 1,4-butanediol and a 2000 molecular weight carboxamide-modified polyesterdiol of the invention will require a butanediol/polyesterdiol mixture in which butanediol accounts for about 67 percent of the total reactive hydrogen equivalents of the mixture. For purposes of simplifying this discussion and of relating to systems based upon conventional polyol resins, the potential equivalents of reactive hydrogen represented by the carboxamide groups of the polyol resin are not here taken into account. Such basis for discussion is employed because the carboxamide groups mainly represent alternate sites for reaction of isocyanate as the supply of available reactive hydrogen atoms on hydroxyl or amino groups is depleted in advanced stages of polyurethane formation. Moreover, as already has been pointed out, and as will be illustrated in the examples hereinbelow, the carboxamide-containing polyol resins of the invention often can be substituted mole for mole for conventional polyol resins of similar structure and like molecular weight and hydroxyl functionality without causing appreciable changes in such basic polyurethane properties as hardness.

In the polyurethane formulations to which the invention is particulary directed, that is, formulations in which a carboxamide-modified polyol resin reacts with isocyanate in the final polyurethane-producing reaction step, the ratio of isocyanate equivalents to total reactive hydrogen equivalents (again discounting the equivalents of potentially reactive hydrogen contained in the carboxamide groups) most often is unity ±10 percent; however, in certain types of polyurethane end product formulations, the ratio of NCO equivalents to non-carboxamide reactive hydrogen equivalents may range from 0.50, and lower, to about 1.50, or even higher. Products employing extremely low ratios are exemplified by polyesterpolyol-tolylene diisocyanate one-shot castable elastomers of low hardness, while certain two-component polyol/moisture-cure reactive coating formulations, for example, employ very high ratios of isocyanate equivalents to total reactive hydrogen equivalents.

Where the carboxamide-containing polyols of the invention are employed in the manufacture of urethane intermediates such as prepolymers, which may be either reactive-hydrogen-terminated (generally hydroxyl-terminated) or isocyanate-terminated, there are essentially two ratio ranges; for reactive-hydrogen-terminated intermediates, the ratio of isocyanate equivalents to reactive hydrogen equivalents generally is in the range of from about 0.2 to 0.8; for isocyanate-terminated intermediates, the ratio usually is in the range of from about 1.3 to about 10. Intermediates containing unreacted NCO groups may have limited storage life and/or require storage at low temperature in view of the possibility of reaction of the isocyanate with carboxamide groups. Although the invention is not particularly directed to such urethane intermediates, they may, however, often be employed to advantage as replacements for conventional intermediates so as to obtain some relative improvement in curing characteristics, as well as in physical properties, in a wide variety of polyurethane systems.

The polyisocyanates which are useful in the polyurethane systems of the invention, as well as in preparation of urethane intermediates from the carboxamide-containing polyol resins of the invention, include many aromatic, aliphatic and aromatic-aliphatic polyisocyanates, some of which are listed by Siefken [Analen 562, pages 122-135 (1949)]. Worthy of particular mention are 4,4'-methylenebis(phenyl isocyanate) and its 2,4'- and 2,2'-isomers; 2,4- and 2,6-tolylene diisocyanate; 1,3- and 1,4-phenylene diisocyanate; α,α'-diisocyanatoxylene-1,3 and -1,4; 4,4',4''-tris(isocyanatophenyl)methane; 1,5-naphthalene diisocyanate; polyisocyanates obtained by phosgenation of aniline-formaldehyde resins; 3,3'-dimethyl-4,4'-diisocyanatobiphenyl; 3,3'-dimethoxy-4,4'-diisocyantobiphenyl; 4,4'-methylenebis(2-methoxyphenyl isocyanate); hexamethylene diisocyanate and the triisocyanate formed by reaction of three moles of it with one mole of water; isophorone diisocyanate; trimethylhexamethylene diisocyanate; methyl-2,4-diisocyanatocyclohexane; 4,4'-methylenebis(cyclohexyl isocyanate); and, the triisocyanate obtained by reaction of three moles of tolylene diisocyanate with one mole of 1,1,1-trimethylolpropane. Other useful polyisocyanates will be apparent to those skilled in the art.

DETAILED DESCRIPTION OF THE INVENTION

The invention may be more fully understood by reference to the following examples in which parts and percentages are by weight unless otherwise specified.

Preparation of Polyols Containing the Carboxamide Group, —[NHC=O]—

EXAMPLE 1a

A 5,000 ml Pyrex ® reaction flask was fitted with an electric heating mantle, ground glass agitator with Teflon ® blade, thermometer, nitrogen inlet, reflux condenser, and distillation column with vacuum distillation train. In the reaction flask were placed 117 g 6-aminohexanol-1 and 1,883 g ε-caprolactone. The mixture was stirred and heated over a one-hour period to 105° C. while a slow stream of dry nitrogen was bubbled through the liquid and vented through the reflux condenser. Then, 0.05 g stannous 2-ethylhexanoate was added, and the temperature of the reaction mixture was increased gradually over a two-hour period to 170° C. The temperature then was held between 170° and 185° C. for 16 hours longer, at which time an additional 0.05 g stannous 2-ethylhexanoate was added. After four hours more at 170°-180° C. with continued slow ebullition of nitrogen gas through the product, it was cooled to room temperature and analyzed. The hydroxyl number was found to be 57.3 and the acid number, 0.74. Upon standing at room temperature the viscous yellow liquid crystallized to a waxy solid.

EXAMPLE 2a

To the reaction vessel of Example 1a were charged 129 g N-(2-aminoethyl)piperazine and 2,071 g ε-caprolactone. Using the general procedure of Example 1, the reaction mixture was heated to 115° C. over a ninety-minute period. Then, 0.06 g dibutyltin diacetate was added and the temperature was increased to 175° C. over the next two hours, and then maintained at 175°-185° for 20 hours more. An additional 0.06 g dibutyltin diacetate was added, and the reaction mixture was held at 175°-190° C. with continued nitrogen ebullition four hours longer. It then was allowed to cool, under nitrogen, to room temperature, whereupon the hydroxyl number was determined to be 50.8 and the acid number, 0.68. Upon standing at room temperature the product set to a waxy, crystalline solid.

EXAMPLE 3a

The apparatus of Example 1a was purged with nitrogen, and 116 g molten 1,6-hexanediamine was added, followed by 1,884 g ε-caprolactone. The mixture was stirred with gentle heating to dissolve the diamine, which had partially solidified on the bottom of the flask. After two hours the temperature reached 110° C., at which time 0.02 g tetraisopropyl titanate was added. Over the next two hours, was continued slow nitrogen ebullition as in Example 1a, the temperature was increased to 170° C., and then was held in the range of 170°-180° C. for 16 hours. The heat then was turned off and, after the product had cooled to 140° C., vacuum was applied and the pressure was held at 1-2 mm Hg until the stirred product had cooled to 70° C. A sample was removed for analysis and found to have a hydroxyl number of 54.9 and an acid number of 0.40. Upon cooling to room temperature, the light yellow viscous liquid crystallized to a waxy solid.

EXAMPLE 4a

The water-cooled reflux condenser of the apparatus of Example 1a was replaced with a dry ice/acetone condenser vented to the atmosphere, and the fractional distillation column and distillation head were replaced with a dropping funnel. Glutaric anhydride (1,368 g) was charged to the flask and blanketed with nitrogen; 284 g 4-aminomethylcyclohexylcarbinol was added dropwise with rapid stirring over a one-hour period, and the warm mixture was heated to 140° C. and stirred at 140°-145° C. for one hour. Then 0.5 g anhydrous stannous chloride dissolved in 10 ml tetrahydrofuran was added slowly from the dropping funnel and the reaction mixture was heated to 160° C. While keeping the temperature in the range, 160°-175° C., 770 g propylene oxide was added dropwise from the dropping funnel at a rate just sufficient to maintain a slight reflux in the dry ice condenser. During this period, a very slow ebullition of dry nitrogen through the reaction mixture was employed to exclude oxygen. After six hours, the propylene oxide feed was complete. The reaction mixture was held at 160°-170° C. for one hour longer, and then the dry ice condenser was replaced with an air condenser. The nitrogen was turned off and vacuum slowly applied at the top of the air condenser so as to evaporate any low boiling residual components. The yellow-brown liquid was cooled to room temperature under 5 mm Hg, and then was analyzed. The hydroxyl number was 95.6 and the acid number, 1.4. The dark, viscous polyester did not solidify while standing at room temperature for several weeks.

EXAMPLE 5a

To the reaction apparatus of Example 1a was charged 105 g 2-(2-aminoethoxy)ethanol (diglycolamine) and 2,195 g of crude 6-hydroxyhexanoic acid (comprised of 6-hydroxyhexanoic acid together with lower oligomers and water of condensation formed upon storage of the hydroxyacid). The reflux condenser was removed and replaced by a stopper. The mixture then was washed over a three-hour period to 210° C., during which time polyesterification proceeded and water of condensation was distilled at atmospheric pressure. Then the pressure was reduced gradually to 25 mm Hg while holding the reaction mixture at 210°-215° C. and additional water was collected in an ice-cooled vacuum receiver. The receiver was emptied of water and 0.05 g stannous 2-ethylhexanoate was added from a syringe to the reaction mixture. The pressure then was further reduced over the next hour to 8-10 mm Hg while water vapor produced by the reaction was exhausted into the vacuum pump, without condensation in the receiver. The temperature then was allowed to fall to 190° C.; 0.05 g additional stannous 2-ethylhexnoate was added and the temperature maintained at 190°-195° C. for seven hours with the pressure at 7-10 mm Hg. The system then was brought to atmospheric pressure by admitting nitrogen to the flask, and the product was allowed to cool. The polyesterdiol was found to have a hydroxyl number of 55.9 and an acid number of 0.25. Upon cooling to room temperature, the pale yellow viscous liquid set to a waxy crystalline solid.

EXAMPLE 6a

To the reaction apparatus of Example 5a was charged 89 g 4-aminobutanol-1 and 2,511 g methyl 6-hydroxyhexanoate. The reaction mixture was heated rapidly to 140° C. while a slow stream of nitrogen was bubbled through the liquid and vented through the distillation train. Then 0.10 g stannous 2-ethylhexanoate was added and the reaction mixture was heated, over a three-hour period, to 210° C., during which time methanol distilled at atmospheric pressure. When distillation of methanol had nearly ceased after 15 minutes at 210° C., 0.05 g additional stannous catalyst was added and the pressure was reduced gradually while methanol continued to be collected in a vacuum receiver cooled in a dry ice/acetone bath. When methanol could no longer be seen collecting in the vacuum receiver with the system at 210°-215° C. and 40-50 mm Hg, the receiver was emptied and the pressure further reduced, gradually, to 10 mm Hg. The pressure was kept at 8-11 mm Hg for five hours more while the reaction mixture was stirred rapidly at 210°-215° C. Then the product was allowed to cool, while stirring under vacuum, to 150° C., whereupon the system was brought to atmospheric pressure by admission of nitrogen to the flask. The yellow liquid product was analyzed and found to have a hydroxyl number of 55.0 and an acid number of 0.20. Upon cooling to room temperature it set to a waxy crystalline solid.

EXAMPLE 7a

To the apparatus of Example 1a was charged 2,000 g of a poly(oxypropylene)diamine of 2,000 molecular weight (JEFFAMINE ™ D-2000 and 230 g ε-caprolactone. While nitrogen was bubbled slowly through the reaction mixture, it was stirred and heated gradually, over three hours, to 170° C. After stirring for three hours longer with nitrogen ebullition at 160°-170° C., the heat was turned off and the product allowed to cool overnight to room temperature while blanketed with nitrogen. The viscous liquid then was analyzed; the hydroxyl number was 50.4 and the acid number was less than 0.20.

EXAMPLE 8a

By means of a procedure similar to that of Example 8a, 2,000 g of a 1,000 molecular weight poly(oxypropylene)diamine (JEFFAMINE ™ D-1000) and 515 g ζ-enantholactone were reacted to produce a carboxamide-containing polyetherdiol with a hydroxyl number of 89.7 and an acid number less than 0.20.

Preparation of Control Polyols Without the Carboxamide Group for Comparative Evaluation

EXAMPLE 1b

Using the apparatus and general procedure of Example 1a, 118g 1,6-hexanediol was reacted with 1,882 g ε-caprolactone to produce a polyesterdiol with a hydroxyl number of 56.8 and an acid number of 0.45. The light yellow viscous liquid crystallized readily, upon cooling to near room temperature, to a waxy solid.

EXAMPLE 2b

Using the apparatus and general procedure of Example 2a, 130 g N-(2-hydroxyethyl)piperazine and 2,070 g ε-caprolactone were reacted to produce a polyesterdiol with a hydroxyl number of 51.4 and an acid number of 0.48. Upon cooling to room temperature, the yellow viscous liquid set to a waxy solid.

EXAMPLE 4b

Using the apparatus and general procedure of Example 4a, 1,368 g glutaric anhydride and 285 g 1,4-bis(hydroxymethyl)cyclohexane were reacted, using a two-hour hold period at 140°–145°. The procedure then was continued as in Example 4a. The dark orange, viscous product did not solidify upon standing at room temperature for three weeks. It had a hydroxyl number of 94.1 and an acid number of 1.25.

EXAMPLE 5b

Using the procedure and apparatus of Example 5a, 106 g of diethylene glycol and 2,195 g of the same crude 6-hydroxyhexanoic acid were reacted to produce a polyesterdiol with a hydroxyl number of 56.2 and an acid number of 0.32. The yellow, viscous liquid set to a waxy solid upon cooling to room temperature.

EXAMPLE 6b

Using the apparatus and general procedure of Example 6a, 90 g 1,4-butanediol and 2,511 g methyl 6-hydroxyhexanoate were reacted to produce a polyesterdiol with a hydroxyl number of 55.5 and an acid number of 0.26. The light yellow viscous liquid set to a waxy crystalline solid upon standing briefly at room temperature.

EXAMPLE 7b

Using the apparatus and general procedure of Example 7a, 2,000 g of a 2,000 molecular weight poly(oxypropylene)glycol (NIAX TM Polyol PPG-2025) was reacted with 230 g ε-caprolactone. However, 0.05 g stannous 2-ethylhexanoate was added when the reaction mixture first reached a temperature of 130° C. and the reaction mixture was stirred at 160°–170° C. for 19 hours rather than three hours as in Example 7a. The hydroxyl number of the pale yellow liquid product was determined to be 51.0 and the acid number was 0.27. It did not solidify after standing at room temperature for two weeks.

EXAMPLE 8b

Using the apparatus and procedure of Example 7b, 2,000 g of a 1,025 molecular weight poly(oxypropylene)glycol (NIAX TM Polyol PPG-1025) was reacted with 515 g ζ-enantholactone to produce a product with a hydroxyl number of 87.4 and an acid number of 0.24. The pale yellow viscous liquid did not solidify upon standing at room temperature for ten days, although it did become hazy. The haziness disappeared immediately upon heating the product to 70° C. while stirring moderately.

Comparison Of Polyurethane Systems Based On Carboxamide-Containing Polyols With Systems Based On Similar, Non-Carboxamide-Containing Polyols

EXAMPLE 9a

A castable "one-shot" polyurethane elastomer was prepared from the carboxamide-containing polyesterdiol of Example 1a as follows: The polyesterdiol (400 g, 0.409 hydroxyl equivalents) was weighed into a clean, open-top two-quart can and heated to 80° C. while degassing in a vacuum oven. Then 50.2 g anhydrous 1,4-butanediol was added, the mixture stirred briefly, and the can returned to the vacuum oven until the temperature of the liquid returned to 80° C. The can was removed from the oven and stirred briefly with a stainless steel spatula; while stirring briskly with the spatula in such a manner as to avoid whipping air bubbles into the liquid, 200 g (1.599 isocyanate equivalents) of 4,4'-diphenylmethane diisocyanate heated to 60° C. was poured into the diol mixture and the stirring continued for 40 seconds, at which time the end of usable pot life was indicated by a rapid exotherm and first emission of visible vapors from the reaction mixture. It was noted, however, that there had not yet been a noticeable increase in the viscosity of the reaction mixture. The liquid was immediately poured into two 6×6×0.075" chromium plated rubber molds which had been previously sprayed with Teflon TM mold release and heated to 105° C. When the mold cavities had been slightly overfilled, the tops were put in place and the molds were stacked on the platens of a hydraulic press which had been preheated to 105°–110° C. The platen clamping force was immediately brought to 60,000 pounds, held for ten seconds, then released and immediately brought back to 60,000 pounds and held at this level for ten minutes. It having been noted that the flash from the molds had solidified to a strikingly strong, elastic material after only five minutes in the press, after ten minutes in the press the molds were removed. They were opened without difficulty and the elastomer specimens were removable immediately without damage. One specimen was cooled quickly with cold running water for five minutes, and two tensile test specimens were cut from it and immediately subjected to tensile testing on a Scott testing machine. Both were found to have developed more than 4,500 psi ultimate tensile strength, this only 20 minutes after being cast. The second molded specimen was placed in a mechanical convection oven at 100°–105° C. and post-cured for 16 hours. This elastomer was opaque and pale yellow-orange in color. Physical properties after two weeks' aging at room temperature are given in Table I.

EXAMPLE 9b

Using the apparatus and procedure of Example 9a, a castable polyurethane elastomer was prepared from 400 g (0.409 hydroxyl equivalents) of the polyesterdiol of Example 1b together with 200 g 4,4'-diphenylmethane diisocyanate (1.599 isocyanate equivalents) and 50.4 g anhydrous 1,4-butanediol (1.118 hydroxyl equivalents). The polyesterdiol of this example differed from that of Example 9a essentially only in that it contained an ester moiety, —[O—C=O]—, in place of the one carboxamide moiety, —[NH—C=O]—, present in each of the polyesterdiol molecules of Example 9a. Within experimental error, the usable pot life of the elastomer was the same as in Example 9a; vapors rising from the reaction mixture were first noted 45 seconds after mixing in the isocyanate. Immediately thereafter the liquid was poured into the two rubber molds, and within 20 seconds after hydraulic pressure had been applied the second time the flash had turned opaque and extremely viscous. After five minutes in the press, the flash had the consistency of a soft cheese. After ten minutes the molds were removed but, upon attempting to open the first one, it was found that this could not be done without damaging the test specimens, which still were soft and cheese-like. The molds were replaced in the press for another twenty minutes, at which time it was found that the mold covers could be removed but that the specimens still were much too fragile to remove from the molds. The open molds were placed in the mechanical convection oven and, after one hour the elastomer specimens could be removed without damage, but only with great care. The specimens then were post-cured in the oven for 16 hours at 100°–105° C., as in Example 9a. After two weeks' aging at room temperature, the physical properties were determined to be as shown in Table I.

EXAMPLE 10a

Using the apparatus and procedure of Example 9a, a castable polyurethane elastomer was prepared from 400 g (0.391 hydroxyl equivalents) of the polyesterdiol of Example 3 together with 37.3 g 1,4-butanediol (0.827 hydroxyl equivalents) and 160 g 4,4'-diphenylmethane diisocyanate (1.279 isocyanate equivalents). Vapors were first noted rising from the reaction mixture 55 seconds after adding the isocyanate. The flash from the molds was elastic after less than five minutes in the hydraulic press, and the molds were opened and the elastomer specimens removed without difficulty after ten minutes in the press. After the standard curing and aging cycles of Example 9a, the light yellow, opaque elastomer specimens were determined to have the physical properties shown in Table I.

EXAMPLE 10b

Using the apparatus and procedure of Example 10a, a castable polyurethane elastomer was prepared from 400 g (0.405 hydroxyl equivalents) of the polyesterdiol of Example 1b together with 36.6 g 1,4-butanediol (0.813 hydroxyl equivalents) and 160 g 4,4'-diphenylmethane diisocyanate (1.279 isocyanate equivalents). Like the reaction of Example 10a, vapors began rising from the reaction mixture noticeably at about 55 seconds after the isocyanate had been stirred in. The flash from the molds turned extremely viscous within 30 seconds after the second application of hydraulic pressure, this indicating the gel point, which was, within experimental error, the same as in Example 10a. However, after ten minutes in the press, it was determined that, although the molds could be opened without damage to the polyurethane specimens, the specimens were still of a cheese-like consistency and could not be removed. The open molds then were placed in the mechanical convection oven at 100°–105° C. for one hour, after which time the specimens were sufficiently cured to be removed from the molds without damage. This being done, the specimens were cured and aged as in Example 10a. The off-white, opaque elastomer specimens were found to have the physical properties reported in Table I. The essential difference between the polyesterdiol of this example and the polyesterdiol of Example 10a is that the latter contains two carboxamide groups, —[NH—C=O]—, per polyesterdiol molecule while the polyesterdiol of this example contains none. This small compositional difference is believed to be responsible for the remarkable difference in curing rates of the two derived elastomer compositions.

EXAMPLE 11a

A castable polyurethane elastomer was prepared from the polyesterdiol of Example 5a (400 g, 0.398 hydroxyl equivalents) together with 36.9 g (0.820 hydroxyl equivalents) of 1,4-butanediol and 160 g (1.279 isocyanate equivalents) of 4,4'-diphenylmethane diisocyanate, using the apparatus and procedure of Example 9a. The behavior of the reactive system was closely similar to that of Example 10a; the most notable difference was that the rates of gelation and development of elasticity of the mold flash were slightly slower, this being attributed to the lower content of carboxamide groups (one —[NH—C=O]— group per polyesterdiol molecule as opposed to two such groups per molecule in the polyesterdiol of Example 10a). The final physical properties of the opaque, pale yellow elastomer specimens are given in Table I. The specimens were slightly more opaque than those of Example 10a.

EXAMPLE 11b

Following the procedure of Example 11a, a castable polyurethane elastomer was prepared from the polyesterdiol of Example 5b, 1,4-butanediol (400 g, 0.398 hydroxyl equivalents and 36.8 g, 0.817 hydroxyl equivalents, respectively) and 160 g of 4,4'-diphenylmethane diisocyanate (1.279 isocyanate equivalents). In comparison with the results of Example 10b, there were no noteworthy differences in behavior of the system. This was not surprising, as theoretically the only significant compositional difference between the polyesterdiols of the two examples was the presence of one ether linkage, —O—, in the polyesterdiol of this example as opposed to none being present in the polyesterdiol of Example 10b. At the same time it can be concluded that the different synthetic method used for preparation of the polyesterdiol in this example, with respect to the polyesterdiol employed in Example 10b, did not produce any compositional differences having a significant affect on curing behavior.

Moreover, the marked difference in curing behavior between the elastomers of Examples 11a and 11b once again points out the surprising effect of incorporating just one —[NH—C=O]— group per polyesterdiol molecule, as this difference was the only significant compositional distinction between the polyesterdiols employed in Examples 11a and 11b: There was one such group per polyesterdiol molecule in Example 11a and none in Example 11b.

EXAMPLE 12a

Using the apparatus of Example 9a, a castable polyurethane elastomer was prepared from 400 g of the polyesterdiol of Example 6a (0.392 hydroxyl equivalents), 240 g 4,4'-diphenylmethane diisocyanate (1.918 isocyanate equivalents) and 134 g 1,4-bis(2-hydroxyethoxy)benzene (1.352 hydroxyl equivalents). The polyester first was weighed into the open-top can and degassed while heating to 75° C. in a vacuum oven. Then, the molten isocyanate, at about 50° C., was added and the mixture stirred for 30 seconds. The resulting solution was placed in the vacuum oven (which was set at 120° C.) and degassed further for twenty minutes, with brief stirring at five-minute intervals. Each time the oven was opened for stirring, the vacuum was broken with dry nitrogen. During this period the temperature of the liquid increased to 115° C., part of the heat coming from the exothermic reaction of the polyester and isocyanate. The resulting quasi-prepolymer then was removed from the oven and the 1,4-bis(2-hydroxyethoxy)benzene, preheated to 120° C., was added immediately and the reaction mixture stirred rapidly with a wide spatula but in such a manner as to avoid whipping air into the liquid. After 70–75 seconds, vapors were noticed rising from the liquid. Stirring was continued for a few seconds longer, and the reaction mixture was poured into the two rubber molds of Example 9a, which analyzed and found to contain 20.32 percent free NCO.

TABLE I

| | | | | | Physical Properties of Castable Elastomers | | | | |
|---|---|---|---|---|---|---|---|---|---|
| Product of Example | | Modulus of Elongation (Psi) | | | Elongation at Break (%) | Ultimate Tensile Strength (psi) | Break Set (%) | Tear Strength A.S.T.M. D-470 (pli) | Compression Set (%) 22 hours at 70° C., 25% deflection |
| | | 100% | 200% | 300% | | | | | |
| 9a | 90A | 1,500 | 1,910 | 2,780 | 520 | 6,150 | 13 | 210 | 22 |
| 9b | 91A | 1,200 | 1,650 | 2,370 | 570 | 5,400 | 24 | 260 | 29 |
| 10a | 82A | 880 | 1,420 | 2,430 | 570 | 7,100 | 15 | 190 | 25 |
| 10b | 82A | 720 | 1,140 | 1,900 | 620 | 6,280 | 28 | 280 | 40 |
| 11a | 80A | 830 | 1,300 | 2,250 | 600 | 7,050 | 18 | 230 | 28 |
| 11b | 81A | 700 | 1,170 | 1,880 | 640 | 6,100 | 32 | 295 | 42 |
| 12a | 95A | 2,470 | 2,880 | 3,510 | 400 | 5,790 | 30 | 305 | — |
| 12b | 94A | 2,140 | 2,680 | 3,350 | 430 | 5,500 | 46 | 340 | — | had been preheated to 120° C. Then the procedure of Example 9a was followed, except that the temperature of the hydraulic press platens was 118° C. After ten minutes in the press, the flash was found to be an opaque, slightly resilient material and, after fifteen minutes total in the press, the molds were opened and the elastomer specimens removed without difficulty. They were post-cured for 16 hours in a mechanical convection oven at 115°-120° C., and then aged at room temperature for two weeks. The physical properties were determined to be as shown in Table I.

EXAMPLE 12b

Using the apparatus and procedure of Example 12a, a polyurethane castable elastomer was prepared from 400 g of the polyesterdiol of Example 6b (0.396 hydroxyl equivalents), 240 g of 4,4'-diphenylmethane diisocyanate (1.918 isocyanate equivalents) and 133.6 g 1,4-bis(2-hydroxyethoxy)benzene (1.348 hydroxyl equivalents). After ten minutes in the press, the flash was a highly opaque hard material, but quite brittle. After five minutes longer the molds were removed and opened, but the elastomer specimens found to be too fragile to remove without damage. The open molds were placed in the mechanical convection oven for one hour, at which time the elastomer could be removed without damage, although it had not yet developed the toughness of the elastomer of Example 12a. Moreover, after post curing for 16 hours longer in the oven, the specimens were noted to be more intensely opaque than those of Example 12a, suggesting a higher degree of crystallinity in the elastomer of this example. After aging two weeks at room temperature, the physical properties were measured and found to be as shown in Table I.

EXAMPLE 13a

Using the apparatus of Example 1a with the distillation train replaced with a dropping funnel, 400 g of the product of Example 7b was added over a 90-minute period to a mixture of 600 g 4,4'-diphenylmethane diisocyanate and 200 g Isonate TM 143L which had been preheated to 60° C. The heating mantle was removed from the resin pot and the rate of addition of the diol was adjusted so as to keep the reaction mixture at 60°-70° C. Fifteen minutes after the diol feed had been completed the heating mantle was replaced and the temperature maintained at 60°-65° C. for one hour longer, while continuing the slow ebullition of nitrogen through the liquid which had begun before the addition of diol. Then the isocyanate-terminated quasi-prepolymer was degassed for ten minutes at 40 mm Hg. Upon cooling to room temperature the product was To a waxed paper cup was charged 100 g of the product of Example 7a, 20.0 g 1,4-butanediol, 0.60 g triethanolamine, 0.30 g water, 0.20 g Dabco TM 33LV, 0.20 g L-520 Silicone Surfactant (Union Carbide) and 0.10 g dibutyltin dilaurate. This mixture was stirred for about one minute at high speed with an air-driven mixer with stainless steel propeller, which caused tiny air bubbles to become dispersed in the liquid. Then 122.1 g of the isocyanate prepolymer of this example was added and the mixture stirred at high speed for 10-12 seconds. The reaction mixture was immediately poured into a 5×5×1" steel mold which had been sprayed with a Teflon TM mold release and preheated to 70° C. The mold was closed and placed in a 70° C. oven. After 3.5 minutes from the time of pouring the reaction mixture into the mold, it was removed from the oven, opened, and the microcellular elastomer specimen removed easily from the mold without damage. In a separate experiment in which the microcellular elastomer was allowed to rise in a one-quart waxed paper cup, the cream time, rise time and tack-free time of this formulation were found to be 18, 48 and 103 seconds, respectively.

EXAMPLE 13b

Using the procedure of Example 13a, a molded microcellular elastomer specimen was prepared by reacting 122.3 g of the quasi-prepolymer of Example 13a with the same polyol pre-mix formulation used in Example 13a except that the 100 g of diol was replaced by 100 g of the diol of Example 7b. The cover could be removed from the mold easily after 3.5 minutes in the mold, but the microcellular elastomer specimen still was too fragile to be removed without damage. In repeat experiments it was found that about 5.0 minutes in the mold was necessary before this formulation could be removed and handled without damage in the manner of Example 13a. The cream time, rise time, and tack-free time of this formulation were found to be 18, 50 and 110 seconds, respectively. The more rapid curing characteristics, without significant change of initial reaction characteristics, of the formulation of Example 13a relative to the formulation of Example 13b is attributed to the presence of two carboxamide groups per molecule of polyol resin in Example 13a as opposed to no carboxamide groups in the polyol resin of Example 13b.

EXAMPLE 14a

Using the apparatus and procedure of Example 13a, a quasi-prepolymer was prepared from 900 g 4,4'-diphenylmethane diisocyanate and 480 g of the polyesterdiol of Example 2b. This product was found to have a free NCO content of 20.45 percent. Then, a microcellular elastomer was prepared from 142.0 g of the prepolymer and a pre-mix of 120 g of the polyesterdiol of Example 2a, 20.0 g 1,4-butanediol, 4.0 g triethanolamine, 0.40 g water, 0.40 g DC-193 Silicone Surfactant (Dow Corning) and 0.10 g of Catalyst T-12 (Metal & Thermit). The microcellular elastomer could be demolded easily without damage after 4.25 minutes in the mold. The cream time, rise and tack-free times for this formulation were separately determined to be 15, 41 and 80 seconds, respectively.

EXAMPLE 14b

A microcellular elastomer was prepared using a procedure and materials identical to that of Example 14a except that, in the polyol pre-mix, 120 g of the polyesterdiol of Example 2b was substituted for the polyesterdiol of Example 2a. The cream, rise and tack-free times of the product were, respectively, 15, 40 and 86 seconds. However, the product could not be demolded without damage until it had been in the closed mold for 5.8 minutes. Also, upon demolding the product was noted to be less resilient than that of Example 14a when it was first demolded. These differences in curing behavior are attributed to the presence of one mono-N-substituted carboxamide group, —[NHC═O]—, per molecule in the polyesterdiol resin of Example 14a as opposed to no mono-N-substituted carboxamide groups in the polyesterdiol resin of this example.

It is to be understood that the invention is not to be limited to the exact details of operation or structure shown and described, as obvious modifications and equivalents will be apparent to one skilled in the art.

I claim:

1. A one-shot polyurethane resin-forming system for preparing a finished polyurethane body comprising a polyisocyanate component and a polyisocyanate reactive component in which the polyisocyanate reactive component consists essentially of a polyol resin or a polyol resin plus a chain extender, each molecule of which polyol resin has in the backbone thereof at least one carboxamide group of the formula —[NHC═O]— in which both free valences are attached to non-aromatic carbon atoms, and not more than one such group per hydroxyl group, said polyol resin being free of urethane linkages and the proportions being such that when the polyisocyanate reactive component and the polyisocyanate component are mixed, the mixture sets up into the desired polyurethane body.

2. The polyurethane resin-forming system according to claim 1, in which the carboxamide group containing polyol resin comprises at least 10 percent of the polyisocyanate reactive component.

3. The polyurethane resin-forming system according to claim 1, in which the system is a castable elastomer system.

4. The polyurethane resin-forming system according to claim 1, in which at least one of the components is a prepolymer.

5. The polyurethane resin-forming system according to claim 1, in which the system contains a chain extender.

6. The polyurethane resin-forming system according to claim 5, in which the chain extender is a low molecular weight compound having at least two isocyanate-reactive groups or water.

7. The polyurethane resin-forming system according to claim 1, in which the carboxamide group containing polyol resin is a polyesterdiol.

8. The polyurethane resin-forming system according to claim 2, in which the carboxamide group containing polyol resin is a polyetherdiol.

9. A one-shot process for making a formed polyurethane body which comprises forming a fluid one-shot polymerizable mixture of a polyisocyanate component and a polyisocyanate reactive component in proportions to form a formed polyurethane body, the polyisocyanate reactive component of which mixture consists essentially of a polyol resin or a polyol resin plus a chain extender, each molecule of which polyol resin in the backbone thereof, has at least one carboxamide group of the formula —[NHC═O]— in which both free valences are attached to non-aromatic carbon atoms, and not more than one such group per hydroxyl group, said polyol resin being free of urethane linkages, forming the resulting mixture while it is still in the fluid unset state, and allowing the formed mixture to set up while in the formed condition.

10. A process for making a formed polyurethane body according to claim 9, in which the carboxamide group containing polyol resin comprises at least 10 percent of the polyisocyanate reactive component.

11. A process for making a formed polyurethane body according to claim 9, in which the formed polyurethane body is a castable elastomer.

12. A process for making a formed polyurethane body according to claim 9, in which at least one of the components is a prepolymer.

13. A process for making a formed polyurethane body according to claim 9, in which the mixture contains a chain extender.

14. A process for making a formed polyurethane body according to claim 13, in which the chain extender is a low molecular weight compound having at least two isocyanate-reactive groups or water.

15. A process for making a formed polyurethane body according to claim 9, in which the carboxamide group containing polyol resin is a polyesterdiol.

16. A process for making a formed polyurethane body according to claim 9, in which the carboxamide group containing polyol resin is a polyetherdiol.

* * * * *

UNITED STATES PATENT AND TRADEMARK OFFICE
CERTIFICATE OF CORRECTION

PATENT NO. : 4,248,994
DATED : February 3, 1981
INVENTOR(S) : William H. Cook

It is certified that error appears in the above—identified patent and that said Letters Patent are hereby corrected as shown below:

Col. 2, line 32; "polyurethanes" should read -- polyurethane --
Col. 3, line 9; "as the" should read -- as of the --
Col. 7, line 56, end of formula; "$OH_2$" delete the "2" should read -- OH --

Col. 9, line 22; "glycol tetraethylene" should read -- glycol, tetraethylene --
Col. 11, line 12; "particulary" should read -- particularly --
Col. 11, line 65; "-diisocyantobiphenyl;" should read
    -- -diisocyanatobiphenyl; --
Col. 13, line 48; "washed" should read -- heated --
Col. 13, line 62; "2-ethylhexnoate" should read -- 2-ethylhexanoate --
Col. 17, lines 56 &   "—[N-         incorrectly hyphenated   -- —[NH— -
           57 ;   H—C=O]—"      should read              C=O] --
Col. 18, lines 30 &   "po-          incorrectly hyphenated   -- poly-
           31 ;   lyesterdiol"  should read                  esterdiol --

Signed and Sealed this

Twenty-first Day of July 1981

[SEAL]

Attest:

GERALD J. MOSSINGHOFF

Attesting Officer

Commissioner of Patents and Trademarks